(12) United States Patent
Wu et al.

(10) Patent No.: US 8,348,805 B2
(45) Date of Patent: Jan. 8, 2013

(54) AUTOMATIC TRANSMISSION DRIVING SYSTEM FOR ELECTRIC VEHICLE MOTOR

(75) Inventors: Sen Wu, Hubei (CN); Zhengce Cao, Hubei (CN)

(73) Assignee: Wuhan University of Technology, Wuhan, Hubei (CN)

( * ) Notice: Subject to any disclaimer, the term of this patent is extended or adjusted under 35 U.S.C. 154(b) by 260 days.

(21) Appl. No.: 13/002,014

(22) PCT Filed: Feb. 2, 2010

(86) PCT No.: PCT/CN2010/000143
§ 371 (c)(1),
(2), (4) Date: Dec. 29, 2010

(87) PCT Pub. No.: WO2010/124518
PCT Pub. Date: Nov. 4, 2010

(65) Prior Publication Data
US 2011/0106360 A1     May 5, 2011

(30) Foreign Application Priority Data

Apr. 27, 2009    (CN) .......................... 2009 1 0061844

(51) Int. Cl.
*B60K 1/02*     (2006.01)
(52) U.S. Cl. .................... 477/3; 477/76; 477/98
(58) Field of Classification Search ............ 477/3, 5, 477/7, 15, 16, 76, 98; 903/903, 906, 907; 180/65.21, 65.285, 65.29, 65.8
See application file for complete search history.

(56) References Cited

U.S. PATENT DOCUMENTS

| 2002/0096886 | A1* | 7/2002 | Schmitz et al. ............. 290/40 C |
| 2008/0312021 | A1 | 12/2008 | Oba | |

FOREIGN PATENT DOCUMENTS

| CN | 2728830 | Y | 9/2005 |
| CN | 1974262 | A | 6/2007 |
| CN | 101198804 | A | 6/2008 |
| CN | 101580014 | A | 11/2009 |
| CN | 101582676 | A | 11/2009 |

* cited by examiner

*Primary Examiner* — Justin Holmes
(74) *Attorney, Agent, or Firm* — Morris Manning & Martin LLP; Tim Tingkang Xia, Esq.

(57) ABSTRACT

The present invention relates to an electric vehicle motor automatic transmission driving system. The motor automatic transmission driving system includes a motor, a gear transmission, one or more battery groups and a control system. The control system includes a motor controller, a system controller, a battery voltage sensor, a battery current sensor, a first rotation speed encoder, a second rotation speed encoder, a fork position sensor group, a transmission oil (fluid) temperature sensor and a pressure source sensor. The power input of the motor controller is connected with the outputs of one or more battery groups respectively via a first power leads, the power output of the motor controller is connected with the power input of the motor via a second power lead. According to the invention, the motor shaft also act as the first shaft of the gear transmission and the said motor is an AC induction motor or an AC permanent magnet motor.

6 Claims, 8 Drawing Sheets

AUTOMATIC TRANSMISSION DRIVING SYSTEM FOR ELECTRIC VEHICLE MOTOR

BACKGROUND OF THE INVENTION

1. Field of Invention

The present invention relates to an electric vehicle motor automatic transmission driving system.

2. Description of the Related Art

Electric vehicles include pure electric vehicle, hybrid electric vehicle and fuel cell electric vehicle. AC induction motor and AC permanent magnet motor are usually chosen as the driving motor of the said electric vehicles.

Both of the above two motors could make use of frequency conversion technology to achieve continuously variable transmission, therefore the variable speed transmission device is usually not necessary in industrial mechanism, and normally also not necessary for a low speed vehicle. But the above continuously variable transmission can not meet the requirement of vehicles run at high speed or vehicles have climbing capability. Variable ratio gear transmission enables a vehicle to use direct transmission or small ration transmission suitable for high speed driving and to use big ratio transmission at low speed to achieve more driving torque to improve climbing capacity.

The variable ratio gear transmission system normally includes a clutch and a gear transmission. There are three types of shifting methods for a transmission. They are sliding spur gear shifting, meshing sleeve shifting and synchronizer shifting. The sliding spur gear shifting and the meshing sleeve shifting can cause shifting shock or combination shock and introduce damage to the meshing gear. The available synchronizers utilize friction theory and enable the working surface of the meshing gear to produce friction torque to overcome the inertia torque of the meshed parts, resulting in speed increase or decrease of the gear and subsequent synchronization of the meshing gear. The disadvantages of synchronizer are that it is difficult to adjust the friction torque, it takes a long time for synchronization, the frictional surface could be damaged easily and the synchronizer device has a short life.

Therefore, a heretofore unaddressed need exists in the art to address the aforementioned deficiencies and inadequacies.

SUMMARY OF THE INVENTION

Accordingly, the present invention is directed to an electric vehicle motor automatic transmission driving system with a simple structure.

To achieve the above purpose, the design scheme of this invention is a motor automatic transmission driving system comprising a motor, a gear transmission, one or more battery group and a control system. The characteristic of the present invention is that the motor shaft also acts as the first shaft of the gear transmission. The said motor is an AC induction motor or an AC permanent magnet motor.

In one embodiment of the present invention, the described control system includes a motor controller, a system controller, a battery voltage sensor, a battery current sensor, a first rotation speed encoder, a second rotation speed encoder, a fork position sensor group, a transmission oil temperature sensor and a pressure source sensor.

Power input of the motor controller is connected with output of two battery groups individually via a first power leads, power output of the motor controller is connected with the power input of the motor via a second power lead. The first, second, third and fourth control signal outputs of the system controller connect the first, second, third and fourth control signal inputs of the motor controller respectively.

The battery current sensor is located on the first power leads. The battery current sensor output is connected with a first analog input of the system controller via a current signal wire.

The battery voltage sensor is located on two lines of the first power leads The battery voltage sensor output is connected with a second analog input of system controller via a voltage signal wire.

An auto electronic accelerator pedal (510) sensor is coupled with a third analog input of the system controller (100) via a electronic accelerator pedal signal wire.

The first rotation speed encoder (1) is located on the motor shaft (2) of the motor (200). The first rotation encoder (1) signal outputs, B and Z, are coupled with a first signal input of the system controller (100) via a signal wire.

The second rotation speed encoder (23) is located on the second shaft (22) of the gear transmission (300). The second rotation speed encoder (23) signal outputs, B and Z, are coupled with a second signal input of the system controller (100) via a signal wire.

The transmission oil (fluid) temperature sensor (330) is located on the bottom of the gear transmission (300) body. The transmission oil (fluid) temperature sensor (330) output is coupled with a third signal input of the system controller (100) via a signal wire.

The pressure sensor (350) of a pressure source is located on the output tube of the pressure source (56). The pressure sensor (350) output of the pressure source is connected with a fourth analog input of the system controller (100) via a signal wire.

The fork position sensor group includes a first position sensor (35), a second position sensor (36), a third position sensor (37), a fourth position sensor (44), a fifth position sensor (45), and a sixth position sensor (46). The first, second and third position sensors, (35), (36), (37), are located above the first core shaft (34) of the first gear transmission operation mechanism. The first position sensor (35), the second position sensor (36), and the third position sensor (37) outputs are connected with the fourth, fifth, and the sixth signal inputs of system controller (100) respectively via signal wires. The fourth, fifth, and the sixth position sensors, (44), (45), (46), are located above the second core shaft (62) of the second gear transmission operation mechanism. The fourth position sensor (44), the fifth position sensor (45), and the sixth position sensor (46) outputs are connected with the seventh, eighth, and the ninth signal inputs of system controller (100) respectively via signal wires.

The electromagnetic-valve group (340) includes a third, a fourth, a first and a second, (53),(54),(58),(59), electromagnetic valves. A fifth, a sixth, a seventh and an eighth control signal output ports of system controller (100) are coupled with input ports of transmission operation mechanism (310) electromagnetic-vale group (340), the first (58), the second (59), the third (53) and the fourth (54) electromagnetic valves, via control signal wires.

The motor casing of the output side of the motor attached to the transmission casing of the gear transmission.

The described gear transmission has 2-4 forward gears transmission ratios.

The system controller includes microprocessor CPU224XPCN, module EM235CN and module EM231CN.

TMO stands for the Z phase pulse jumping time of the second rotation speed encoder (23) and TMX stands for the Z phase pulse imputing time of the first rotation speed encoder.

When the output of zero signal TMO is positive, TMO coincides with the gear top middle line of the second sliding sleeve (27), and the gear top middle line of the first sliding sleeve coincides with the gear top middle line of the second sliding sleeve.

When the output of zero signal TMX is positive, TMX coincides with the tooth root middle line of the first gear engaged gear ring on the second shaft (19) (ensure the tooth root middle lines of each gear engaged gear ring overlap at the same time).

When TMO and TMX are positive, TMO of the second rotation speed encoder and TMX of the first rotation speed encoder coincide.

The Advantages of the Present Invention Include:

1. AC induction motor or permanent magnet motor shaft also acts as the input shaft of the gear transmission. Therefore mechanical parts of the motor and the transmission are highly integrated to form a compact mechanical structure.

2. The motor casing of the output part of the motor attached to the gear transmission body and form a compact mechanical structure.

3. The present invention excludes the clutch between the motor and the gear transmission, the synchronizer in traditional transmission, and introduces a gear engaged sliding sleeve gear shifting structure. The accurate and rapid speed regulation capability of the AC induction motor or AC permanent magnetic motor is utilized to fulfill the speed coincidence and phase coincidence control during gear shifting. Air pressure or hydraulic pressure operation mechanism is utilized to complete gear shifting. Thus the system is automatically controlled. The characteristics of the present invention includes rapid response, with shifting time less than 1 second; accurate control, with the same rotation speed control and phase error less than 1°; and smooth gear shifting, with no gear no gear impact.

4. This control system has strong anti-inference capability and electromagnetic compatible capability. The high rotation speed resolution of rotation speed encoder and the rapid response of the zero signal output and the motor guarantees high accuracy control and rapid response of the system. Real-time sampling of the battery by voltage and current sensors guarantees shifting operation under reasonable battery status. Position sensors installed in each gear of the transmission achieve a closed loop control of the system. Air pressure control of shifting operation enables a simple control. Collection of motor oil (fluid) temperature enables determination of optimal no-load torque of the motor. The pressure sensor guarantees stability of gear shifting of the system.

5. Output characteristics of the encoder and the characteristics of the gear enables accurate installation location and thus obtain phase for the encoder nesting shaft. Rotation speed and phase of the motor and the second shaft of the transmission are determined in real time by two rotation speed encoders and signals are fed back. Thus rotation speed and phase of the meshing engaged gear ring can be acquired by the calculation corresponding to each gear ratio. The transmission gear position sensors measure position of the transmission fork in real time and give feedback of transmission gear position. Through the system controller and the motor controller, the motor tracks rotation speed and phase of the second transmission shaft, adjusts the rotation speed of the first and the middle shafts rapidly and accurately, enables the rotation speed of the meshing engaged gear ring and sliding sleeve of the transmission coincide, and ensure the phase requirement be met. Utilizing the rapid response, high accurate speed adjustment characteristics of the motor and signal feedback from the rotation speed encoder and transmission gear position sensors, the system actively adjust rotation speed and phase of the first and middle shafts of the transmission based on rotation speed of the second shaft of the transmission, thus enable the meshing transmission engaged gear ring and the sliding sleeve have the same rotation speed and phase, and subsequently accomplish transmission automatic gear shifting via pneumatic operation mechanism.

6. In order to ensure a stable engaged rotation speed and a smooth, no impact gear shifting, the motor must work under an optimal no-load torque at different gear during gear shifting. The optimal no-load torque at different gear is determined by the system moment of inertia, oil (fluid) temperature, fluid level and rotation speed. The present invention utilizes a control system to achieve the smooth and no impact gear shifting.

BRIEF DESCRIPTION OF THE DRAWINGS

The drawings described below are for illustration purpose only. The drawings are not intended to limit the scope of the present teaching in any way.

DETAILED DESCRIPTION OF THE PRESENT INVENTION

Figure 1:
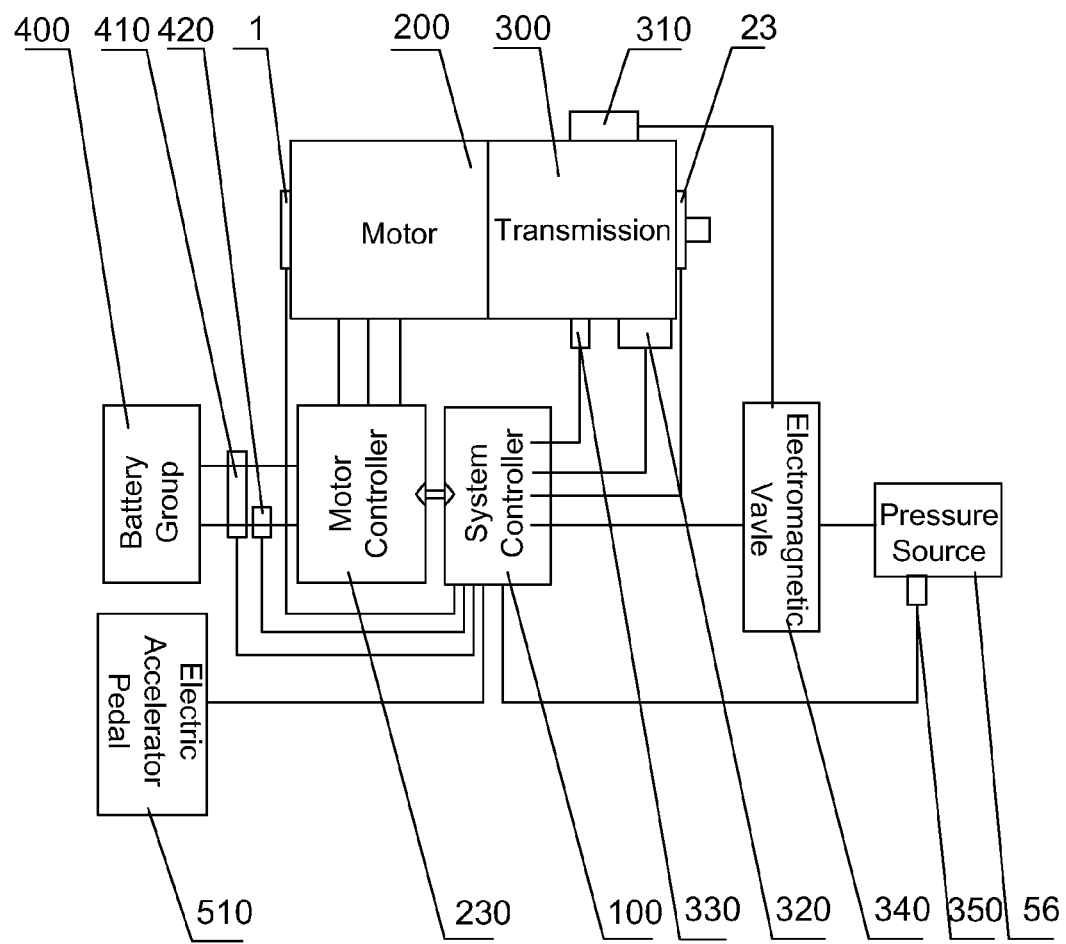
FIG. 1 shows a structural profile according to one embodiment of the present invention.

A list of reference numerals with corresponding components as shown in the drawing is given in the following table only for the purpose of a reader's convenience:

| | |
|---|---|
| 1-First rotation speed encoder | 2-Motor shaft (The first shaft) |
| 3-First supporting bearing | 4-Left cover |
| 5-Motor casing | 6-Motor rotator |
| 7-Second supporting bearing | 8-Transmission body |
| 9-Constant mesh gear on the first shaft | 10-Gear engaged gear ring on the first shaft |
| 11-First spline hub | 12-First fork |
| 13-Third gear engaged gear ring on the second shaft | 14-Tthird gear on the second shaft |
| 15-Second gear on the second shaft | 16-Second gear engaged gear ring on the second shaft |
| 17-Second fork | 18-Second spline hub |
| 19-First gear engaged gear ring on the second Shaft | 20-First gear on the second shaft |
| 21-Third supporting bearing | 22-Second shaft |
| 23-Second rotation speed encoder | 24-Fourth supporting bearings |
| 25-Middle shaft | 26-First gear on the middle shaft |
| 27-Second sliding sleeve | 28-Second gear on the middle |

-continued

| | |
|---|---|
| | shaft |
| 29-Third gear on the middle shaft | 30-First sliding sleeve |
| 31-Ball bearing | 32-Middle shaft constant mesh gear |
| 33-Fifth supporting bearing | 34-First core shaft |
| 35-First position sensor | 36-Second position sensor |
| 37-Third position sensor | 38-First spring collar |
| 39-First spring | 40-First spring plate |
| 41-First piston | 42-First air pressure cylinder block |
| 43-First entrance | 44-Fourth position sensor |
| 45-Fifth position sensor | 46-Sixth position sensor |
| 47-Second spring collar | 48-Second spring |
| 49-Second spring plate | 50-Second piston |
| 51-Second air pressure cylinder block | 52-Third entrance |
| 53-Third electromagnetic valve | 54-Fourth electromagnetic valve |
| 55-Fourth entrance | 56-Pressure source |
| 57-Second valve base | 58-First electromagnetic valve |
| 59-Second electromagnetic valve | 60-Second entrance |
| 61-First valve base | 62-Second core shaft |
| 100-System controller | 200-Motor |
| 230-Motor controller | 300-Gear transmission |
| 310-Transmission operation mechanism | 320-Fork position sensor group |
| 330-Transmission oil (fluid) temperature sensor | 340-Electromagnetic valve group |
| 400-Battery group | 410-Battery voltage sensor |
| 420-Battery current sensor | 510-Vehicle electronic accelerator pedal |

Driving System Structure

Figure 2:
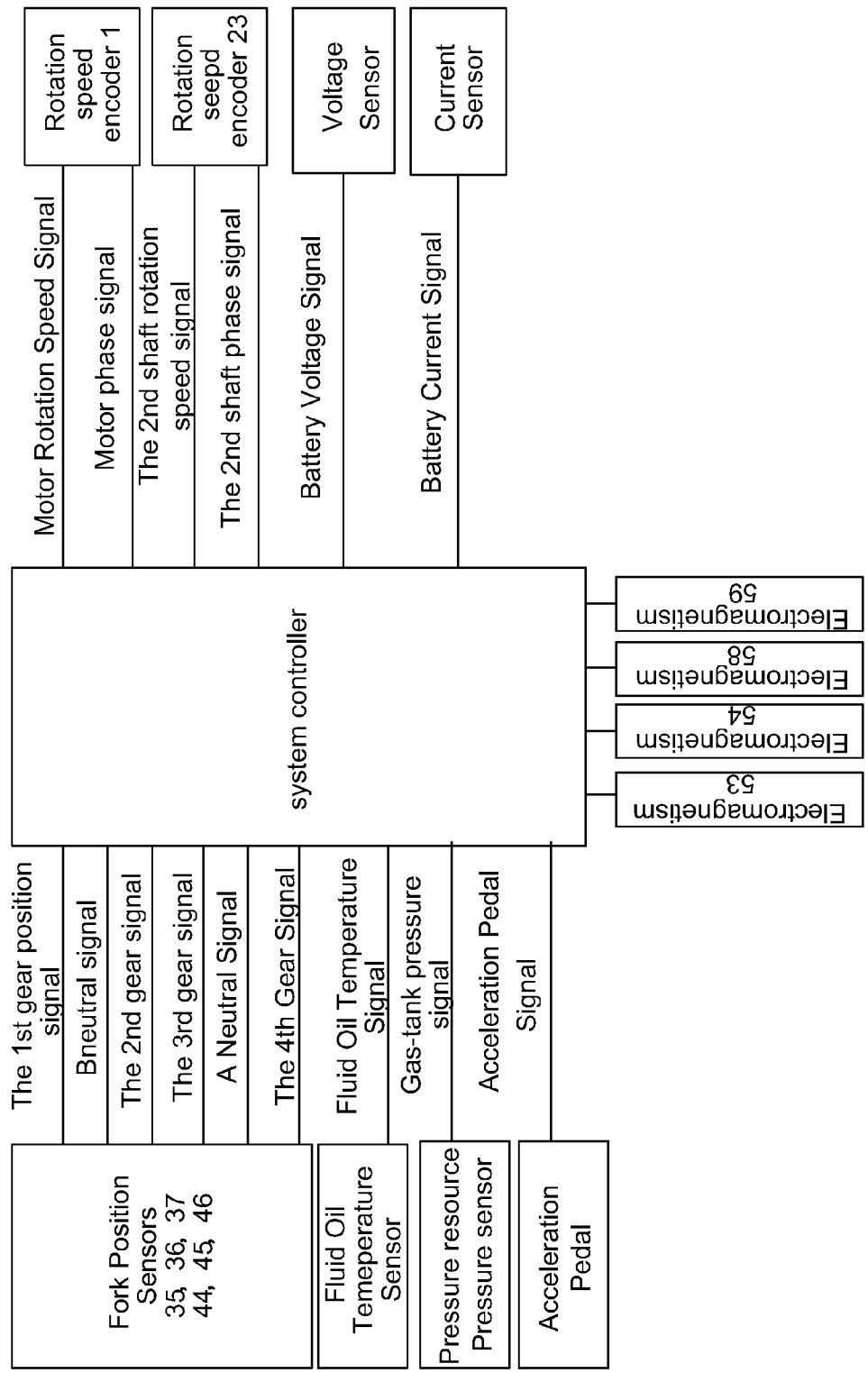
FIG. 2 shows principle of a control system according to one embodiment of the present invention.
Figure 3:
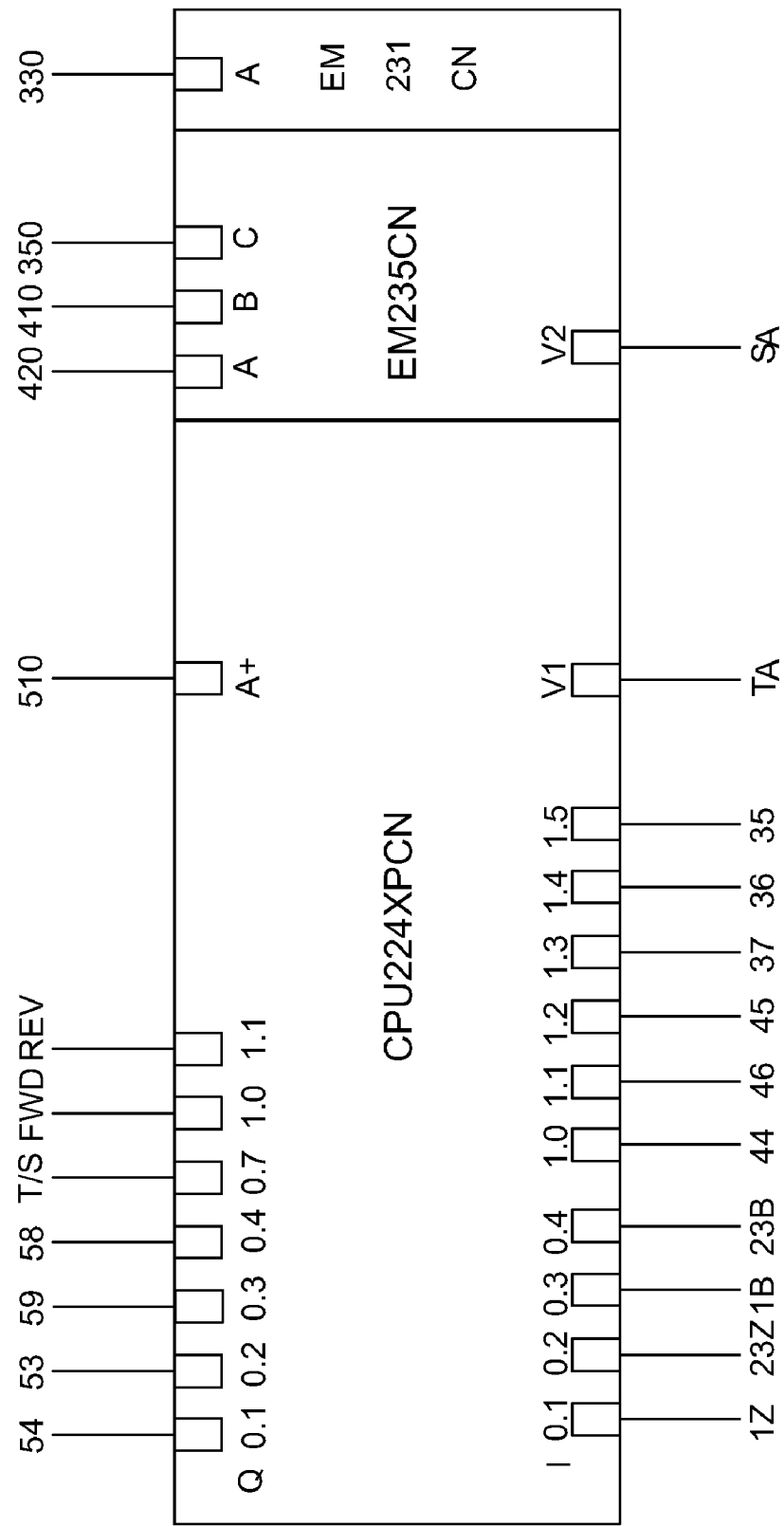
FIG. 3 shows a wiring diagram of a system controller according to one embodiment of the present invention.

As FIGS. 1-3 show, in an embodiment of the present invention, the electric vehicle motor automatic transmission driving system includes a motor 200, a gear transmission 300 (4 forward ears transmission is introduced as an embodiment of this application), one or more battery group 400, and a control system. The motor shaft (i.e. output shaft of the motor) also acts as the first shaft of gear transmission (i.e. input shaft of the transmission) [The first transmission shaft (the input shaft) is replaced by the motor shaft 2]. The said motor is an AC induction motor or an AC permanent magnet motor.

The described control system includes a motor controller 230, a system controller 100, a battery voltage sensor 410, a battery current sensor 420, a first rotation speed encoder 1, a second rotation speed encoder 23, a fork position sensor group 320, a transmission oil (fluid) temperature sensor 330, and a pressure source sensor 350.

The system controller 100 includes microprocessor CPU224XPCN, module EM235CN and module EM231CN. The module EM235CN is located between the microprocessor CPU224XPCN and the module EM231CN. System Controller 100 is a module structure and includes CPU224XPCN+EM235CN+EM231CN, SIEMENS.

The motor controller 230 is FRENIC5000VG7S series, Fuji Electric Company, Japan. Power input of the motor controller 230 is connected with power output of two battery group 400 respectively via the first power leads (two leads, corresponding to two output wiring terminals). Power output of the motor controller 230 is connected with power input of the motor 200 via the second power lead.

CPU224XPCN control signal outputs, which are Q1.0, Q1.1, Q0.7 and V1, of system controller 100 are connected with the controller 230 control signal inputs, which are FWD, REV, T/S, and TA (control motor forward driving, motor reverse driving, torque/speed mode switch and torque size, respectively. EM235CN analog output, V2, is connected with the motor controller 230 SA terminal, and control rotation speed of the motor).

The battery current sensor 420 is located on the first power leads. Output of the battery current sensor 420 is connected with the analog input terminal A of EM235CN in system controller 100 via current signal wire.

The battery voltage sensor 410 is located on the second power lead. Output of the battery voltage sensor 410 is connected with the analog input terminal B of EM235CN in system controller 100 via voltage signal wire.

Auto electronic accelerator pedal 510 sensor is coupled with analog input terminal A+ of CPU224XPCN in system controller 100 via electronic accelerator pedal signal wire.

The first rotation speed encoder 1 is located on the motor shaft 2 of the motor 200 (or located on the middle shaft 25). The first rotation speed encoder 1 signal outputs, B and Z (FIG. 3, 1B and 1Z), are coupled with signal input terminal 10.3 and 10.1 of CPU224XPCN in the system controller 100 via signal wire.

The second rotation speed encoder 23 is located on the second shaft 22 of gear transmission 300. The second rotation speed encoder 23 signal outputs, B and Z (FIG. 3, 23B, 23Z), are coupled with signal input terminal 10.4 and 10.2 of CPU224XPCN in the system controller 100 via signal wire.

The transmission oil (fluid) temperature sensor 330 is located on the bottom of gear transmission 300 body. Output of the transmission oil (fluid) temperature sensor 330 is coupled with signal input terminal A of EM231CN in the system controller 100 via signal wire.

The pressure sensor 350 of pressure source is located on the output tube of pressure source 56. Output of the pressure sensor 350 for pressure source is connected with analog input terminal C of EM235CN in the system controller 100 via signal wire.

The fork position sensor group 320 includes a first position sensor 35, a second position sensor 36, a third position sensor 37, a fourth position sensor 44, a fifth position sensor 45, and a sixth position sensor 46. The first, second and third position sensors 35, 36 and 37 are located above the first core shaft 34 in the first gear transmission operation mechanism of the gear transmission 300. Outputs of the first position sensor 35, the second position sensor 36, and the third position sensor 37 are connected with signal input terminal 11.5, 11.4 and 11.3 of CPU224XPCN in the system controller 100 respectively via signal wires. The fourth, fifth, and the sixth position sensors 44, 45 and 46 are located above the second core shaft 62 in the second gear transmission operation mechanism of the gear transmission 300. Outputs of the fourth position sensor 44, the fifth position sensor 45, and the sixth position sensor 46 are connected with signal input terminal I1.0, I1.2 and I1.1 of CPU224XPCN in the system controller 100 respectively via signal wires.

The electromagnetic-valve group 340 includes a third electromagnetic valve 53, a fourth electromagnetic valve 54, a first electromagnetic valve 58 and a second electromagnetic valve 59. Control signal output terminal Q0.2, Q0.1, Q0.4 and Q0.3 of CPU224XPCN in the system controller 100 are connected with input terminal of the first electromagnetic valve 58, the second electromagnetic valve 59, the third electromagnetic valve 53 and the fourth electromagnetic valve 54 of electromagnetic-vale group 340 in the transmission operation mechanism 310 respectively via control signal wires.

Motor and Gear Transmission Structure

Figure 4:
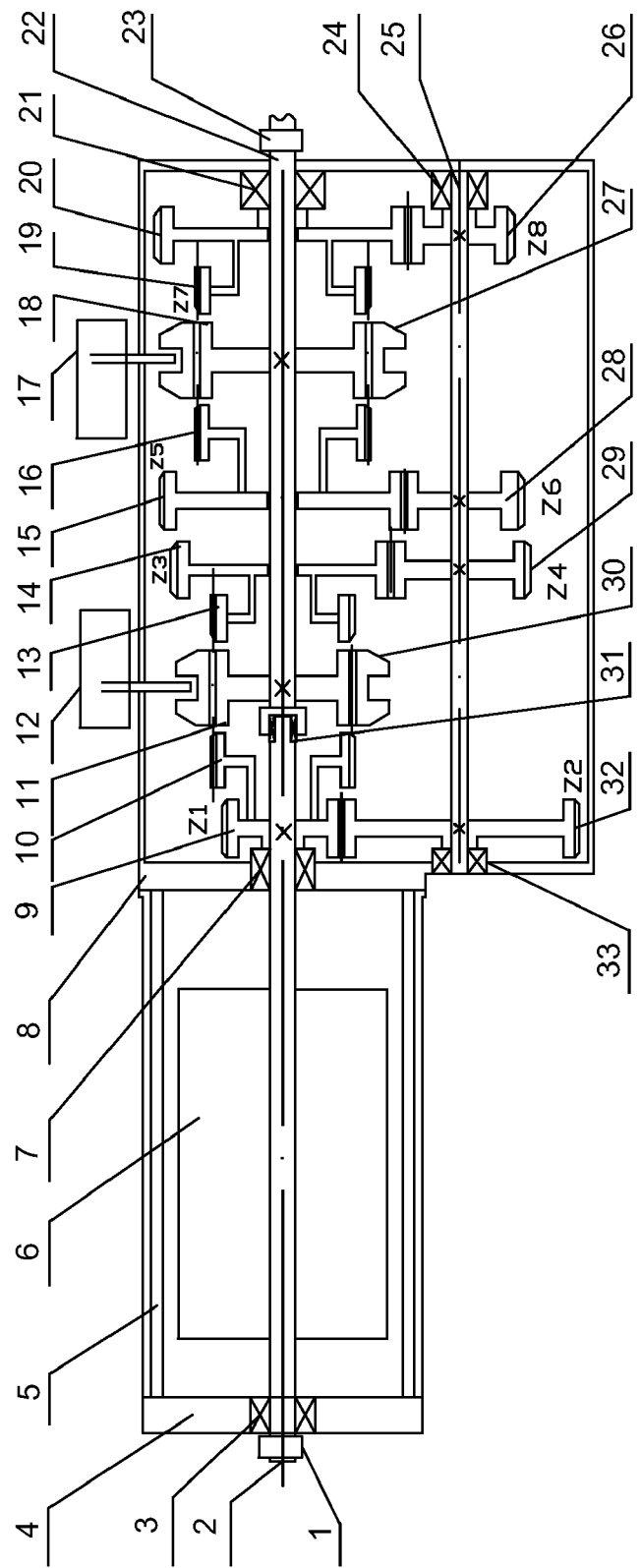
FIG. 4 shows a motor and transmission structure profile according to one embodiment of the present invention.

As shown in FIG. 4, the motor casing 5 on the output end of the described motor is attached to the casing of the transmission body 8 of the gear transmission (e.g. bolted connection), thus exclude a motor right cover. The described AC induction motor or AC permanent magnet motor has the similar structure to the same type of motors in the art. A first supporting bearing 3 and a second supporting bearing 7 are located on the motor shaft 2. The first supporting bearing 3 is located on a left cover 4. The difference of the present invention from related art is that the right cover of the motor is replaced by the transmission casing, and the second supporting bearing 7 is located on the transmission casing.

The described gear transmission is a 4-gear ratio sliding sleeve gear transmission.

The described gear transmission includes a transmission operation mechanism 310, a transmission body 8, a constant mesh gear on the first shaft 9, a gear engaged gear ring on the first shaft 10, a first spine hub 11, a third gear engaged gear ring on the second shaft 13, a third gear on the second shaft 14, a second gear on the second shaft 15, a second gear engaged gear ring on the second shaft 16, a second spine hub 18, a first gear engaged gear ring on the second shaft 19, a first gear on the second shaft 20, a third supporting bearing 21, a second shaft 22, a fourth supporting bearing 24, a middle shaft 25, a first gear on the middle shaft 26, a second sliding sleeve 27, a second gear on the middle shaft 28, a third gear on the middle shaft 29, a first sliding sleeve 30, a ball bearing 31, a constant mesh gear on the middle shaft 32 and a fifth supporting bearing 33.

Figure 5:
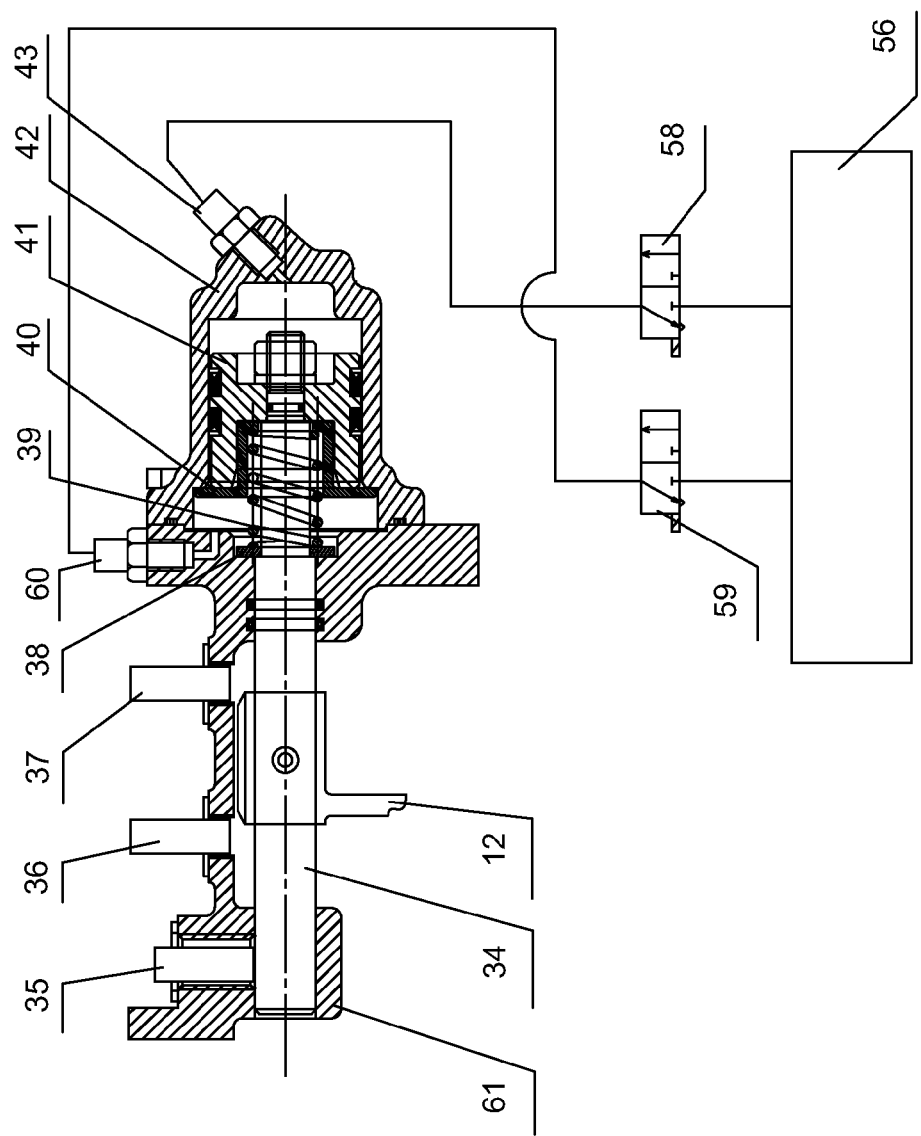
FIG. 5 shows a first operation mechanism structure profile according to one embodiment of the present invention.
Figure 6:
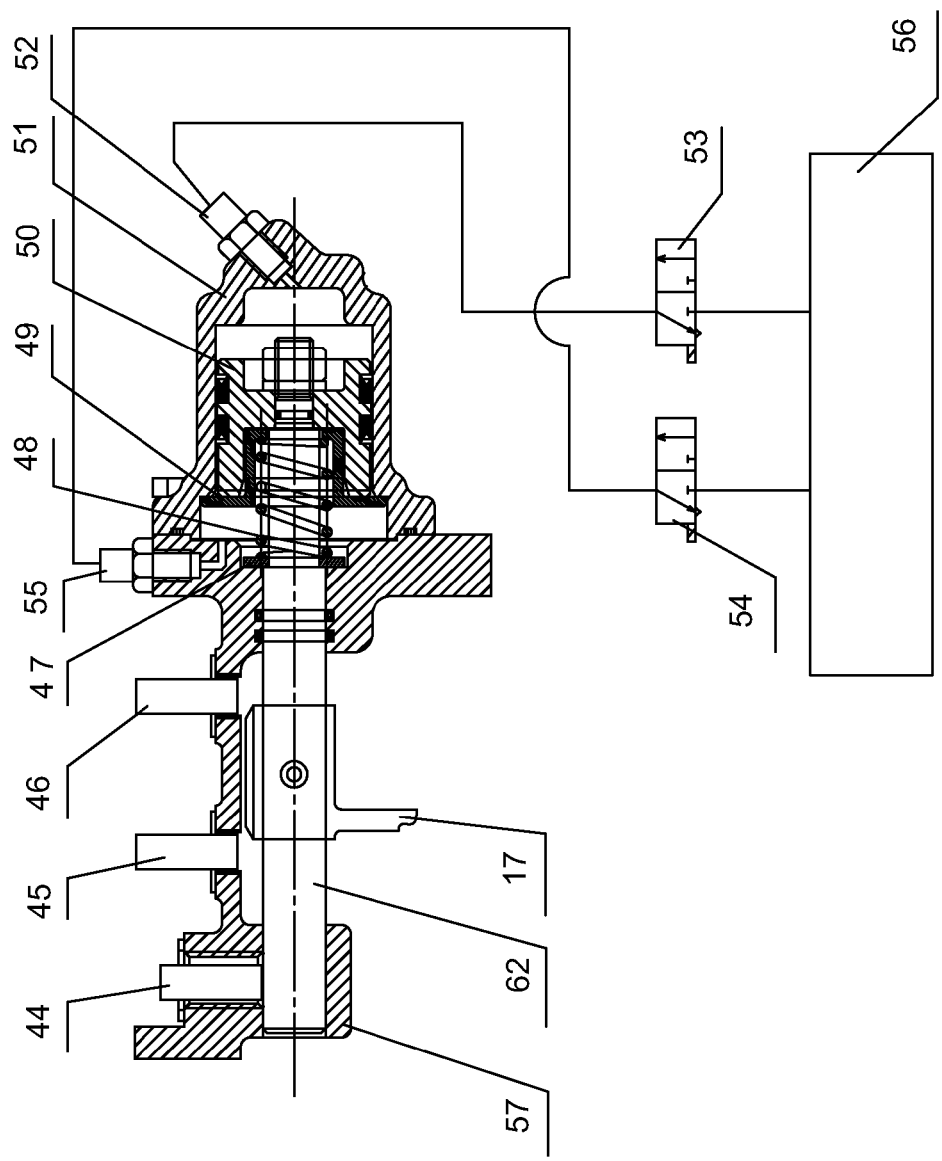
FIG. 6 shows a second operation mechanism structure profile according to one embodiment of the present invention.

The transmission operation mechanism group 310 includes a first operation mechanism, as shown in FIG. 5 and a second operation mechanism, as shown in FIG. 6.

The right part of the motor shaft 2, which is also the first shaft of the gear transmission, is located in the transmission body 8. The right end of the motor shaft 2 contains the ball bearing 31 and the left end of the second shaft 22 contains a bearing slot. The said ball bearing inserts to the said bearing slot (the motor shaft and the second shaft can rotate individually; the second shaft 22 is supported by the motor shaft via the ball bearing). The constant mesh gear on the first shaft 9, which is attached to the right part of the motor shaft, and the gear engaged gear ring on the first shaft 10, which is attached to the constant mesh gear on the first shaft 9, are located within the casing of transmission body 8. The right part of the second shaft 22 is coupled with the transmission body 8 via the third supporting bearing 21. The right part of the second shaft 22 is located outside the transmission body 8 (the second shaft is the output shaft of the gear transmission).

The first spline hub 11 is located within the transmission body 8 and built into the left part of the second shaft 22. It is next to the gear engaged gear ring on the first shaft 10. The first sliding sleeve 30 is coupled with the first spline hub 11 via a spline. The first fork 12 of the first operation mechanism is attached to the first sliding sleeve 30. The third gear engaged gear ring on the second shaft 13 and the third gear on the second shaft 14 are located within the transmission body 8. The third gear on the second shaft 14 is attached to the second shaft 22 via bearing (the second shaft 22 does not rotate when the third gear on the second shaft 14 rotates). The third gear on the second shaft 14 is located on the right side of the first spline hub 11. The third gear engaged gear ring on the second shaft 13 is attached to the third gear of the second shaft 14. The third gear engaged gear ring on the second shaft 13 is next to the first spline hub 11 (the first sliding sleeve 30 slips into the engaged gear ring of the first shaft 10 via the first fork 12, so that the first spline hub 11 can be coupled with the gear engaged gear ring of the first shaft 10; alternatively, the first sliding sleeve 30 slips into the third gear engaged gear ring of the second shaft 13, so that the first spline hub 11 can be coupled with the third gear engaged gear ring of the second shaft 13.

The second gear on the second shaft 15, the second gear engaged gear ring on the second shaft 16, the second spline hub 18, the first gear engaged gear ring on the second shaft 19 and the first gear on the second shaft 10 are located within the transmission body 8. The second gear on the second shaft 15 and the first gear on the second shaft 10 are sleeved on the second shaft 22 via bearings.

The second spline hub 18 is attached to the second shaft 22. The second gear on the second shaft 15 is located to the right side of the third gear of the second shaft 14. The second spline hub 18 is located to the right side of the second gear of the second shaft 15. The first gear on the second shaft 20 is located to the right side of the second spline hub 18. The second gear engaged gear ring on the second shaft 16 is attached to the second gear on the second shaft 15. The first gear engaged gear ring on the second shaft 19 is attached to the first gear on the second shaft 20. The second gear engaged gear ring on the second shaft 16 and the first gear engaged gear ring on the second shaft 19 are next to the second spline hub 18 respectively (the second sliding sleeve 27 slips into the second gear engaged gear ring of the second shaft 16 so that the second spline hub 18 is coupled with the second gear engaged gear ring of the second shaft 16; alternatively, the second sliding sleeve 27 slips into the first gear engaged gear ring of the second shaft 19 so that the second spline hub 18 is coupled with the first gear engaged gear ring of the second shaft 19). The second sliding sleeve 27 is coupled with the second spline hub 18 via spline. The second fork 17 of the second operation mechanism is attached to the second spline hub 18.

The middle shaft 25 is located within the transmission body 8. The right end of the middle shaft 25 is connected with the transmission body 8 via a fourth supporting bearing 24 and the left end of the middle shaft 25 is coupled with the transmission body 8 via a fifth supporting bearing 33. The first gear 26, the second gear 28, the third gear 29 and the constant mesh gear 32 on the middle shaft are located within the transmission body 8. The first gear 26, the second gear 28, the third gear 29 and the constant mesh gear 32 on the middle shaft are attached to the middle shaft 25. The first gear on the middle shaft 26 is meshed with the first gear on the second shaft 20. The second gear on the middle shaft 28 is meshed with the second gear on the second shaft 15. The third gear on the middle shaft 29 is meshed with the third gear on the second shaft 14. The constant mesh gear on the middle shaft 32 is meshed with the constant mesh gear on the first shaft 9. The first rotation speed encoder 1 is located on the motor shaft 2 and the second rotation speed encoder 23 is located on the second shaft 22.

The teeth numbers of each gear are: $Z1$ for the constant mesh gear on the first shaft 9; $Z2$ for the constant mesh gear on the middle shaft 32; $Z4$ for the third gear on the middle shaft 29; $Z6$ for the second gear on the middle shaft 28; $Z8$ for the first gear on the middle shaft 26; $Z3$ for the third gear on the second shaft 14; $Z5$ for the second gear on the second shaft 15; $Z7$ for the first gear on the second shaft 20.

When the first sliding sleeve 30 and the second sliding sleeve 27 are in the middle position (as shown in FIG. 4), each gear on the second shaft is free geared and the second shaft can not be driven. This gear position is neutral position.

When the second fork 17 pushes the second sliding sleeve 27 to mesh the first gear engaged gear ring on the second shaft (the first gear on the second shaft 20), the driving power of the first shaft are transferred to the second shaft, and the first gear ratio is:

$$i_1 = \frac{Z2}{Z1} \cdot \frac{Z7}{Z8}$$

Similarly, the second gear ratio is:

$$i_2 = \frac{Z2}{Z1} \cdot \frac{Z5}{Z6}$$

The third gear ratio is:

$$i_3 = \frac{Z2}{Z1} \cdot \frac{Z3}{Z4}$$

The fourth gear ratio is $$i_4=1$$

Transmission Operation Mechanism, (e.g., The Pneumatic Mechanism)

As shown in FIG. 5, the described operation mechanism includes a first fork 12, a first core shaft 34, a first spring collar 38, a first spring 39, a first spring plate 40, a first piston 41, a first air pressure cylinder block 42, a first electromagnetic valve 58, a second electromagnetic valve 59 and a first valve base 61.

Left end of the first valve base 61 has a left shaft hole, and right end of the first valve base 61 has a right shaft hole. The first air pressure cylinder block 42 has a piston chamber inside and the first piston 41 is located within the piston chamber. The left end of the first air pressure cylinder block 42 is attached to the right end of the first valve base 61 via bolt (sealed with a sealing ring). A first entrance 43 is located on the first air pressure cylinder block 42. The first entrance 43 is connected with the piston chamber and located on the right side of the first piston 41. The second entrance 60 is located on the right side of the first valve base 61. The second entrance 60 is connected with the piston chamber and located on the left side of the first piston 41. Right shaft hole of the first valve base 61 connects with the cylinder chamber. Right end of the first core shaft 34 passes through the right shaft hole of the first valve base 61 and attached to the first piston 41 (the first core shaft 34 has thread on the right end, the right end passes through the first piston 41 and fixed by a nut). The first spring collar 38, the first spring 39 and the first spring plate 40 are sleeved on the right part of the first core shaft 34. The first spring 39 is located between the first spring collar 38 and the first spring plate 40. The first spring collar 38, the first spring 39 and the first spring plate 40 are located within the cylinder chamber individually. The left end of the first core shaft 34 penetrates the left shaft hole in the left end of the first valve base 61 (movement of the first piston 41 drives the movement of the first core shaft 34). The first fork 12 is attached to the middle part of the first core shaft 34. The first position sensor 35, the second position sensor 36 and the third position sensor 37 are attached above the first core shaft 34. The first entrance 43 on the first air pressure cylinder block 42 is connected with the pressure source 56 (compressed air source) via the first tube. The first electromagnetic valve 58 is located on the first tube. The second entrance 60 on the first valve base 61 is connected with the pressure source 56 (this embodiment use air pressure as example, e.g. compressed air source) via the second tube. The second electromagnetic valve 59 is located on the second tube. The first core shaft 34 can slide on the first valve base 61.

The first entrance 43 (E1) and the second entrance 60 (E2) are connected with atmosphere when the two ends of the first piston 41 are free from air pressure. The first spring plate 40 is pushed to the right limit end of the first air pressure cylinder block 42 (the limit end is located on the left side of the cylinder chamber of the first air pressure cylinder block 42) via the first spring 39. As shown in FIG. 5, the first fork 12 is on neutral position and the first position sensor P1 (35) sends a neutral position signal. Meanwhile, the outputs of the second position sensor P2 (36) and the third position sensor P3 (37) are zero.

The second operation mechanism and the first operation mechanism have the same mechanical structure. The status of the second operation mechanism is the same to the one of the first operation mechanism.

As shown in FIG. 6, the second operation mechanism contains a second fork 17, a second spring collar 47, a second spring 48, a second spring plate 49, a second piston 50, a second air pressure cylinder block 51, a third electromagnetic vale 53, a fourth electromagnetic vale 54, a second valve base 57 and a second core shaft 62.

Left end of the second valve base 57 has a left shaft hole, and right end of the second valve base 57 has a right shaft hole. The second air pressure cylinder block 51 has a piston chamber inside and the second piston 50 is located within the piston chamber. The left end of the second air pressure cylinder block 51 is attached to the right end of the second valve base 57 via bolt (sealed with a sealing ring). A third entrance 52 is located on the second air pressure cylinder block 51. The third entrance 52 is connected with the piston chamber and located on the right side of the second piston 50. A fourth entrance 55 is located on the right side of the second valve base 57. The fourth entrance 55 is connected with the piston chamber and located on the left side of the second piston 50. Right shaft hole of the second valve base 57 is attached to the cylinder chamber. Right end of the second core shaft 62 passes through the right shaft hole of the second valve base 57 and attaches to the second piston 50 (the second core shaft 62 has thread on the right end, the right end passes through the second piston 50 and fixed by a nut). The second spring collar 47, the second spring 48 and the second spring plate 49 are sleeved on the right part of the second core shaft 62. The second spring 48 is located between the second spring collar 47 and the second spring plate 49. The second spring collar 47, the second spring 48 and the second spring plate 49 are located within the cylinder chamber individually. The left end of the second core shaft 62 penetrates the left shaft hole in the left end of the second valve base 57 (movement of the second piston 50 drives the movement of the second core shaft 62). The second fork 17 is attached to the middle part of the second core shaft 62. The fourth position sensor 44, the fifth position sensor 45 and the sixth position sensor 46 are installed above the second core shaft 62. The third entrance 52 on the second air pressure cylinder block 51 is connected with the pressure source 56 (compressed air source) via the third tube. The third electromagnetic valve 53 is located on the third tube. The fourth entrance 55 on the second valve base 57 is connected with the pressure source 56 (this embodiment use air pressure as example, e.g. compressed air resource) via the fourth tube. The fourth electromagnetic valve 54 is located on the fourth tube.

When the first gear ratio is required, the fourth electromagnetic valve 54 opens. The compressed air is introduced via the fourth entrance F2 (55) and the third entrance 52 (F1) is connected with atmosphere. The second piston 50 is pushed to the right until the right limit end of the second air pressure cylinder block 51 (the limit end is located on the left side in the cylinder chamber of the second air pressure cylinder block 51). The second piston 50 moves the second fork 17 via the second core shaft 62. The second fork 17 then moves the second sliding sleeve 27 and make it engaged with the first gear 20 on the second shaft, i.e. the second sliding sleeve 27 meshes the first gear engaged gear ring 19 on the second shaft. Meanwhile the sixth position sensor P6 (46) sends the first gear ratio signal; the neutral position signal of the fourth position sensor P4(44) is rested; the fifth position sensor P5 (45) is zero; the outputs of the first position sensor P1 (35), the second position sensor P2 (36) and the third position sensor P3 (37) are also zero. The second spring 48 is compressed under this condition.

When the gear shifting is required, such as shifting from the first gear to the second gear, the fourth electromagnetic valve 54 is closed initially. The fourth entrance F2(55) switches to the atmosphere. The second piston 50, the second fork 17 are moved to the neutral position by the second spring 48. The fourth position sensor P4 (44) sends out the neutral gear signal with the output being 1. The output of the sixth position sensor P6 (46) is zero. Thereafter the third electromagnetic valve 53 is open; the compressed air is introduced via the third entrance F1 (52) and pushes the second piston 50 and the second spring plate 49 towards the left until the left limit end of the second air pressure cylinder block 51. At this time the second sliding sleeve 27 connects with the second gear engaged gearing 16 on the second shaft; the second fork 17 is located on the second gear position; the output of the fifth position sensor P5 (45), which sends the second gear signal, is 1; the second gear 48 is under the compressed status. Meanwhile, output of the fourth position sensor P4 (44) and the sixth position sensor P6 (46) are zero.

During gear shifting process, the first position sensor P1 (35), the second position sensor P2(36) and the third position sensor P3 (37) in the first operation mechanism have only one output, i.e. there is only one output from a sensor while output from the other two sensors are zero. Position sensors of the second operation mechanism have the same characteristics.

The third and fourth gear operations are controlled by the first operation mechanism. The first and the second gear operations are controlled by the second operation mechanism.

The two fork-mechanisms lock each other via pneumatic circuit. The second fork 17 is on the neutral position when the first fork 12 is at work, and vice versa.

Principle of Gear Shifting Process
(1) Determination of the Optimal No-Load (Idle) Torque Under Different Gear Ratios During gear shifting, when transmission is under neutral condition, the motor must work at an optimal no-load torque according to different engaged gears in order to ensure a stable engaged rotation speed and phase. It is critical for a smooth gear shifting.

The optimal no-load torque includes motor rotator moment of inertia, transmission shafts and gear train rotator moment of inertia, mechanical resistance torque, which are determined by the system inertia and rotation speed, and the oil (fluid) resistance torque of transmission.

The oil (fluid) resistance torque of transmission is mainly related to the viscosity of oil (fluid), the depth of the immersed shafts and gears, and the rotation speed of the shafts and gears. The gear transmission includes an oil (fluid) loading level limit device and a transmission oil (fluid) temperature sensor 330. The oil (fluid) moment of resistance under different rotation speeds and different temperatures can be calculated by the oil (fluid) resistance computing method.

Due to the transmission speed ratio difference, the optimal no-load torque under different gear ratio is different. The value of the system optimal no-load torque under different gear ratios can be calibrated via trial based on the parameters described above.

(2) The Meshing Gear Rotation Speed and Phase Calculation

The transmission of the present embodiment includes a 4 forward gears. Gear shifting is described here using an example of shifting from low speed gear to high speed gear, e.g., from the first gear to the second gear.

When gear transmission works at the first gear, which means the first gear engaged gear ring on the second shaft 19 is coupled with the second sliding sleeve 27. Shifting to the second gear require the second gear engaged gear ring on the second shaft 16 to connect with the second sliding sleeve 27. It means the second sliding sleeve 27 is required to leave the third gear engaged gear ring on the second shaft 13 and move from the middle position to the position, in which the second sliding sleeve 27 is coupled with the second gear engaged gear ring on the second shaft 16. The detailed operation process is as follows:

(i) Speed Calculation

B phase pulse outputs of the first rotation speed encoder 1 and the second rotation speed encoder 23 are collected in high speed by CPU224XPCN through I0.3 and I0.4. Via the formula $$n = \frac{N_P}{N \cdot t_A}(r/\min) \qquad (1)$$

wherein n is the test shaft rotation speed, $N_P$ is B phase pulse number collected by the controller, N is number of B phase pulse numbers per revolution of encoder, $t_A$ is the sampling time, the motor rotation speed $n_m$ (corner mark m stands for the motor) and the second shaft rotation speed $n_2$ (corner mark 2 stands for the second shaft) could be calculated. Given the condition of gear shifting, in which $n_{mt}$ stands for the motor rotation speed, $n_{2t}$ stands for the second shaft speed, according to the second gear ratio, the relationship is introduced as follows:

$$n_{mt} = n_{2t} i_2 \qquad (2)$$

(ii) Phase Calculation

Figure 7:
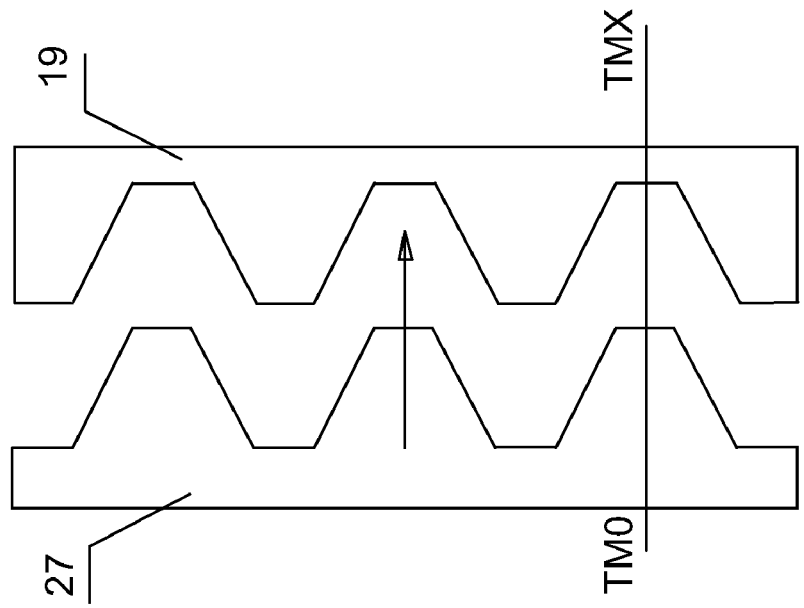
FIG. 7 shows the output principle of a rotation speed encoder according to one embodiment of the present invention.

As shown in FIG. 7, A and B are encoder rotation speed pulse outputs with 90° phase difference from each other, wherein, pulse period is $$T = 2\pi/N$$

wherein N stands for A and B phase pulse outputs per encoder revolution. N is more than 500 for control accuracy requirement.

Z stands for the zero position signal output of the encoder. TM stands for the pulse width.

$$X_1 + X_2 = 0.5T \pm 0.1T$$

$$X_3 + X_4 = 0.5T \pm 0.1T$$

Meanwhile:

$$TM = 0.25T$$

where $X_1$, $X_2$, $X_3$, $X_4$ stands for phase difference between phase A and phase B in high level prompt jump.

The nesting shaft rotation speed and phase could be accurately evaluated via the pulse outputs of encoder A, B and Z.

Figure 8:
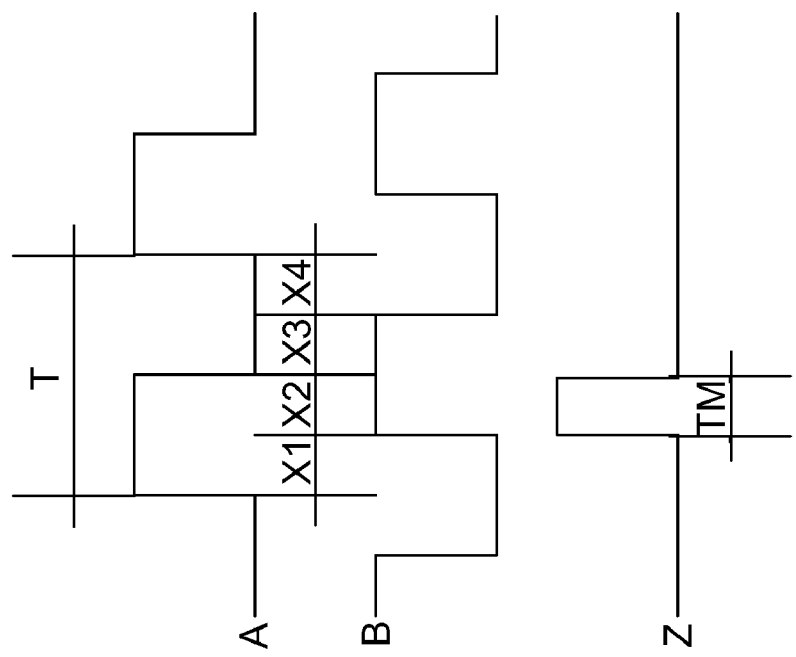
FIG. 8 shows a transmission sliding sleeve and engaged gear ring schematic plan according to one embodiment of the present invention.

FIG. 8 is a schematic plane expansion view of the sliding sleeve 27 and engaged gear ring 19 corresponding to the first gear of gear transmission. The second sliding sleeve 27 can be moved to the right to engage the first gear engaged gear ring on the second shaft 19. TMO stands for Z phase pulse prompt jump timing of the rotation speed encoder 23. TMX stands for Z phase pulse prompt jump timing of the rotation speed encoder 1.

Phases of the motor shaft and the second shaft are determined based on FIG. 8 during installing of the first rotation speed encoder 1 and the second rotation speed encoder 23. When output signal is positive, zero signal TMO of the second rotation speed encoder (23) coincides with the gear top middle line of the second sliding sleeve (27), and the gear top middle line of the first sliding sleeve coincides with the gear top middle line of the second sliding sleeve.

When output signal is positive, zero signal TMX of the first rotation speed encoder 1 coincides with the tooth root middle line of the first gear engaged gear ring on the second shaft 19 (meanwhile, make sure that tooth-root middle line of each gear engaged gear ring is overlapped, i.e. the tooth-root middle lines of the first gear engaged gear ring 10 on the first shaft, the third gear engaged gear ring on the second shaft 13, the second gear engaged gear ring on the second shaft 16, the first gear engaged gear ring on the second shaft 19 are overlapped on each other). At the same time, when output is positive, the zero signal output of both the first rotation speed encoder 1 and the second rotation speed encoder 23 are overlapped during installation During the work process of the transmission, terminal I0.1 of CPU224XPCN detects the Z phase prompt jump timing TMO of the rotation speed encoder 23 and terminal I0.2 of CPU224XPCN detects the Z phase prompt jump timing TMX of the rotation speed encoder 1 using TMO as the time base of the phase. Terminal I0.3 f CPU224XPCN collects the B phase pulse output of the rotation speed encoder 1 in high rotation speed, so that B phase pulse output number NBt of the rotation speed encoder 1 between TMO timing and TMX timing can be achieved. Therefore the phase difference between the motor shaft 2 and the second shaft 22 is:

$$\theta_M = N_{Bt}T.$$

Meanwhile, the phase difference between the engaged gear ring 19 and the sliding sleeve 27 is:

$$\theta = \theta/i_2,$$

i.e. $\theta = N_{Bt}T/i_2$.

Figure 9:
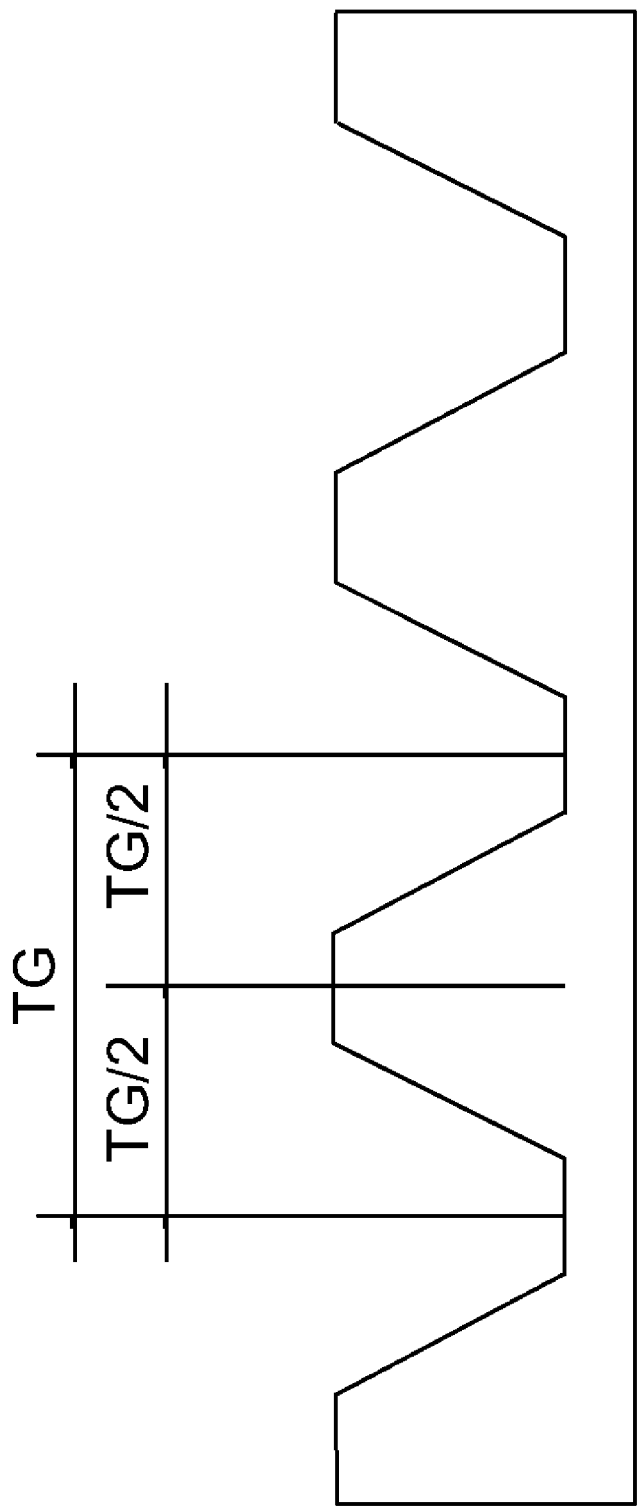
FIG. 9 shows a transmission sliding sleeve and engaged gear ring developed schematic plan according to one embodiment of the present invention.

Both the transmission sliding sleeve and the engaged gear ring have gear mesh structure with the same gear tooth number. The gear tooth number determines the gear rotation angle of each gear. When the gear tooth number is $N_G$, the second shaft rotation angel corresponding to each pair of gear top+gear root of the engaged gear can be achieved according to FIG. 9 as follows:

$$T_G = 2\pi/N_G$$

Therefore, let $$k = \theta/T_G$$

If $k=0, 1, 2, 3 \ldots N_G$, the engaged gearing 19 and the sliding sleeve 27 have the same phase as shown in FIG. 7. Otherwise, the engaged gear ring 19 and the sliding sleeve 27 have overlapped teeth in phase, which leads to the gear shifting impact and failure. Therefore the engaged gear ring 19 and the sliding sleeve 27 must have both the same rotation speed and the same phase, i.e. the phase requirement of $k=0, 1, 2, 3 \ldots N_G$ must be met. Otherwise the phase of the motor has to be adjusted.

Control Method of Gear Shifting (e.g., from the First Gear to the Second Gear)

When the system starts gear shifting, control signal from the acceleration pedal 510 is blocked by the system controller. The control mode of the motor is switched from torque control mode $T_{mode}$ to the speed control mode $S_{mode}$ by the system controller. In order to reduce the friction of withdrawing the fork, the output torque of the motor is set to zero to enable the motor under the condition of critical idling.

Electromagnetic valve 54 is reset and the second fork 17 returns to the neutral position via B valve. Once the gear position sensors send position signals feedback, i.e. P4=1, P5=0, P6=0, (if the third gear is switched into the fourth gear, the signals will be P1=1, P2=0, P3=0), the transmission is at neutral position.

The control motor adjust the speed to $n_{mt}$ with the maximum torque, so that the formula (2) is met.

During the process of motor speed adjustment to the targeted speed of $n_{mt}$, the rotation speed of the second shaft can not avoid little changes caused by the fluctuation of the outside load. Therefore sampling of instant rotation speed $n_2$ and the phase of the second shaft is necessary. Synchronization of the motor and the second shaft rotation speed must be evaluated before the opening of the fourth electromagnetic valve 53, which means:

$$n_{mt} = n_2 i_2$$

$$K = 0, 1, 2, 3 \ldots N_G \quad (3)$$

Once the system rotation speeds meet the formula (3), output torque of the motor can be reduced to the optimal no-load torque $T_2$ to maintain the rotation speed. Meanwhile set the positional of electromagnetic valve 54. The second fork 17 enters the second gear via the valve B. Once the gear position sensors send the positional signals feedback, i.e. $P_4=0, P_5=1, P_6=0$, (if the third gear is switched into the fourth gear, the signals will be $P_1=0, P_2=1, P_3=0$), the transmission is working at the second gear. It means gear shifting operation is successful.

Subsequently, the control mode of the motor is switched from speed control mode to torque control mode by the system controller. The speed limit is adjusted to the maximum value, and the motor control is brought back to the acceleration pedal. The whole gear shifting operation is completed.

The other gear shifting operations can also be completed according to the control and the adjustment methods described above.

Testing Data

Testing related parameters: $i_1=5$, $i_2=2$, Oil (fluid) Temperature=40° C.

| ITEM | P4 | P5 | P6 | $n_{mt}$(r/min) | $n_{2t}$(r/min) |
|---|---|---|---|---|---|
| Initial Status | 0 | 0 | 1 | 2500 | 500 |
| From the first gear to the neutral | 1 | 0 | 0 | 2485 | 497 |
| Gear shifting time for the switching from the first gear to the neutral (s) | 0.25 | — | 0.1 | — | — |
| Synchronization process rotation speed change | 1 | 0 | 0 | 994 | 497 |
| Synchronization time | — | — | — | 0.3 | — |
| From the neutral to the second gear | 0 | 1 | 0 | 994 | 497 |

-continued

| ITEM | P4 | P5 | P6 | $n_{mt}$(r/min) | $n_{2t}$(r/min) |
|---|---|---|---|---|---|
| Gear shifting time for the switching from the neutral to the second gear (s) | 0.1 | 0.4 | — | — | — |
| The total operation time for the process from the first gear to the second gear (s) | | | 0.95 | | |

This invention could also be applied into 2 forward gears or the 3 forward gears transmission, and the corresponding applications are not explained herein.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An electric vehicle motor automatic transmission driving system, comprising:
   a control system;
   a motor connected with the control system;
   a gear transmission connected with the control system and the motor; and
   one or more battery group connected with the control system, wherein a shaft of the motor acts as the first shaft of the gear transmission and the motor is selected from the group concludes an AC induction motor and an AC permanent magnet motor,
   wherein the control system comprises:
   a motor controller, wherein the power input of the motor controller is connected with the power output of the one or more battery group individually via a first power leads and the power output of the motor controller is connected with the power input of the motor via a second power lead;
   a system controller, wherein the outputs of a first, a second, a third and a fourth control signal of the system controller are connect with the inputs of a first, second, third and fourth control signal of the motor controller, respectively;
   a battery voltage sensor located on the two lines of the first power leads of the battery group, wherein the output of the battery voltage sensor is connected with a second analog input of the system controller via voltage signal wire;
   a battery current sensor located on a first power leads of the battery group, wherein the output of the battery current sensor is connected with a first analog input of the system controller via current signal wire;
   a first rotation speed encoder located on a motor shaft of the motor, wherein the signal outputs of the first rotation speed encoder B and Z are coupled with a first signal input of the system controller via signal wire;
   a second rotation speed encoder located on a second shaft of the gear transmission, wherein the signal outputs of the second rotation speed encoder B and Z are coupled with a second signal input of the system controller via signal wire;
   a fork position sensor group comprising a first position sensor, a second position sensor, a third position sensor, a fourth position sensor, a fifth position sensor, and a sixth position sensor,
   wherein the first, second and third position sensors are located above a first core shaft of a first gear transmission operation mechanism, the outputs of the first position sensor, the second position sensor, and the third position sensor are connected with a fourth, a fifth, and a sixth signal inputs of the system controller respectively via signal wires; and
   wherein the fourth, fifth and sixth position sensors are located above the second core shaft of a second gear transmission operation mechanism, the outputs of the fourth position sensor, the fifth position sensor, and the sixth position sensor are connected with a seventh, an eighth, and a ninth signal inputs of the system controller respectively via signal wires;
   wherein a transmission oil (fluid) temperature sensor located on a bottom of a gear transmission body, wherein the output of the transmission oil (fluid) temperature sensor is coupled with a third signal input of system controller via signal wire;
   wherein a pressure source sensor located on a output tube of a pressure source, wherein the output of the pressure source sensor of the pressure source is connected with a fourth analog input of the system controller via signal wire;
   wherein an auto electronic accelerator pedal sensor attached to an accelerator pedal, wherein the output of the auto electronic accelerator pedal sensor is connected with a third analog input of the system controller via electronic accelerator pedal signal wire; and
   wherein an electromagnetic-valve group comprises a first, a second, a third and a fourth electromagnetic valves, wherein the input terminals of the above four electromagnetic valves of transmission operation mechanism are coupled with the output terminals of a fifth, a sixth, a seventh and a eighth control signal of the system controller via control signal wires.

2. The electric vehicle motor automatic transmission driving system according to claim 1, wherein a motor casing at the output terminals side of the motor is attached to a transmission body of the gear transmission.

3. The electric vehicle motor automatic transmission driving system according to claim 1, wherein the gear transmission is a 2-4 forward gears transmission.

4. The electric vehicle motor automatic transmission driving system according to claim 1, wherein the gear transmission comprises:
   a transmission body;
   a transmission operation mechanism attached to the transmission body, comprising a first operation mechanism and a second operation mechanism;
   a motor shaft (a first shaft) with its right part locates in the transmission body, comprising a ball bearing in the right end;
   a second shaft locates to the right of the first motor shaft, comprising a bearing slot in the left end, wherein
   the ball bearing on the right end of the motor shaft is inserted into the bearing slot in the left end of the second shaft, and the right part of the second shaft located outside the transmission body and coupled with the transmission body via a third supporting bearing;

a constant meshing gear of the first shaft located inside the transmission body and attached to the right part of the motor shaft;

a first shaft gear engaged gear ring located inside the transmission body and attached to the constant meshing gear of the first shaft;

a first spline hub located inside the transmission body, to the right of the first shaft gear engaged gear ring and attached to the left part of the second shaft;

a first sliding sleeve coupled with the first spline hub via spline;

a first fork of the first operation mechanism attached to the first sliding sleeve;

a third gears engaged gear ring on the second shaft located within the transmission body and to the right of the first spline hub;

a third gear of the second shaft located within the transmission body and to the right of the first spline hub, wherein the third gear of the second shaft is sleeved on the second shaft via bearing;

a third gears engaged gear ring located inside the transmission body and fixed on the third gear of the second shaft;

a second gear on the second shaft located within the transmission body, to the right of the third gear of the second shaft, and sleeved on the second shaft via bearings;

a second gear engaged gear ring on the second shaft located within the transmission body, and attached to the second gear on the second shaft;

a second spline hub located inside the transmission body, to the right of the second gear of the second shaft, the second gear engaged gear ring on the second shaft and attached to the second shaft;

a second fork of the second operation mechanism attached to the second spline hub;

a first gear on the second shaft located within the transmission body, to the right of the second spline hub, and sleeved on the second shaft via bearings;

a first gear engaged gear ring on the second shaft located within the transmission body, to the right of the second spline hub and attached to the first gear on the second shaft;

a third supporting bearing located within the transmission body, to the right of the first gear on the second shaft and attached to the right end of the second shaft;

a middle shaft located inside the transmission body and under the second shaft, wherein the right part of the middle shaft is connected with the transmission body via a fourth supporting bearing and the left part of the middle shaft is coupled with the transmission body via a fifth supporting bearing;

a first gear on the middle shaft attached to the right side of the middle shaft and meshed with the first gear on the second shaft;

a second sliding sleeve coupled with the second spline hub via spline;

a second gear of the middle shaft attached to the middle shaft and meshed with the second gear on the second shaft;

a third gear on the middle shaft attached to the middle shaft and meshed with the third gear on the second shaft;

a first sliding sleeve coupled with the first spline hub via spline; and a constant meshing gear on the middle shaft attached to the left side of the middle shaft and meshed with the constant meshing gear on the middle shaft.

5. A method of installing the first rotation speed encoder and the second rotation speed encoder in the electric vehicle motor automatic transmission driving system according to claim 1, comprising:

aligning the zero signal TMO of the second rotation speed encoder with a tooth top middle line of a second sliding sleeve and aligning a tooth top middle line of a first sliding sleeve with the tooth top middle line of the second sliding sleeve when output of the zero signal TMO is positive;

aligning the zero signal TMX of the first rotation speed encoder with a tooth root middle line of a first gear engaged gear ring on a second shaft and aligning tooth top middle lines of a first gear engaged gear ring on the first shaft, a third gear engaged gear ring on a second shaft, the second gear engaged gear ring on the second shaft, the first gear engaged gear ring on the second shaft when output of the zero signal TMX is positive; and aligning zero signal of the first rotation speed encoder and zero signal of the second rotation speed encoder when their output are positive, wherein TMO stands for the Z phase pulse jumping time of the second rotation speed encoder and TMX demonstrates for the Z phase pulse imputing time of the first rotation speed encoder.

6. A method of determining the optimal no-load torque in the electric vehicle motor automatic transmission driving system according to claim 1, comprising:

collecting depth and temperature of the oil (fluid) from a oil (fluid) loading level limit device and the transmission oil (fluid) temperature sensor;

calculating the transmission oil (fluid) resistance torque using fluid viscosity, the depths of the immersed shafts and the gears, and the rotation speed;

calculating motor rotator moment of inertia, transmission shafts and gear train rotator moment of inertia using the system inertia and rotation speed; and determining the optimal no-load torque using motor rotator moment of inertia, transmission shafts and gear train rotator moment of inertia, mechanical resistance torque and transmission oil resistance torque.

\* \* \* \* \*